United States Patent [19]
DiBiagio et al.

[11] Patent Number: 5,951,082
[45] Date of Patent: *Sep. 14, 1999

[54] FLEXIBLE PLUMBING ASSEMBLY

[75] Inventors: Anthony J. DiBiagio, Granger, Ind.;
Gordon G. Hastings, Columbus, Ohio;
Todd C. Krenelka, Columbus, Ohio;
Thomas J. Ward, Columbus, Ohio

[73] Assignee: Monaco Coach Corporation, Coburg, Oreg.

[*] Notice: This patent is subject to a terminal disclaimer.

[21] Appl. No.: 09/122,529

[22] Filed: Jul. 24, 1998

Related U.S. Application Data

[63] Continuation of application No. 08/821,905, Mar. 21, 1997, Pat. No. 5,816,639, which is a continuation of application No. 08/520,166, Aug. 25, 1995, Pat. No. 5,658,031.

[51] Int. Cl.[6] .................................................. B60R 27/00
[52] U.S. Cl. ........................ 296/26.13; 296/165; 296/156
[58] Field of Search .............................. 296/26.09, 26.13, 296/136, 165, 171, 175

[56] References Cited

U.S. PATENT DOCUMENTS

| | | | |
|---|---|---|---|
| 2,193,352 | 3/1940 | Thomas | 296/33 |
| 4,076,272 | 2/1978 | Penton | 280/421 |
| 4,133,571 | 1/1979 | Fillios | 296/23 |
| 4,295,678 | 10/1981 | Morris | 296/156 |
| 4,600,817 | 7/1986 | Hackenburg | 191/12 |
| 4,620,741 | 11/1986 | Hanemaayer | 296/156 X |
| 4,654,900 | 4/1987 | McGhee | 4/191 |
| 4,960,299 | 10/1990 | Steadman | 296/26 |
| 5,090,749 | 2/1992 | Lee | 296/26 |
| 5,237,782 | 8/1993 | Cooper | 296/26 |
| 5,658,031 | 8/1997 | DiBiagio et al. | 296/26.13 |
| 5,816,639 | 10/1998 | DiBiagio et al. | 296/26.13 |

*Primary Examiner*—Joseph D. Pape
*Attorney, Agent, or Firm*—Leydig, Voit & Mayer, Ltd

[57] ABSTRACT

A flexible plumbing assembly for use in a trailer with an extensible cabin having rigid plumbing that can be moved between a retracted position wherein the extensible cabin is substantially inside the trailer and an extended position wherein the extensible cabin is substantially outside the trailer. The flexible plumbing assembly comprising a flexible hose connecting the trailer rigid plumbing to the cabin rigid plumbing, a sliding guide for horizontally moving the connection of the flexible hose to the cabin rigid plumbing at a constant elevation relative to the cabin floor as the cabin rigid plumbing moves with the cabin between the extended and retracted positions, and hose guide for ensuring that material in the flexible hose moves in the proper direction as the cabin moves between the extended and retracted positions. In the preferred embodiment the sliding guide comprises a support bracket which holds the connection of the flexible hose to the cabin rigid plumbing and is slidably attached to a track that is generally parallel to both the floor and the front and rear walls of the cabin.

27 Claims, 3 Drawing Sheets

FLEXIBLE PLUMBING ASSEMBLY

This is a continuation of Ser. No. 08/821,905, filed Mar. 21, 1997, now U.S. Pat. No. 5,816,639 which is a continuation of Ser. No. 08/520,166 filed Aug. 25, 1995, now U.S. Pat. No. 5,658,031.

FIELD OF THE INVENTION

This invention generally relates to flexible plumbing assemblies and, more particularly, to flexible plumbing assemblies for use in travel trailers, fifth wheel trailers, motor homes, recreational vehicles and the like provided with extensible room portions for increasing the living space in the trailer.

BACKGROUND OF THE INVENTION

Many travel trailers have a central or main room containing an extensible cabin portion which is laterally extendable in order to increase the interior space of the trailer when the trailer is parked at its final destination. The extensible cabin portion is typically slidably supported upon the floor of the main room for movement between a stored, retracted position and an extended position.

Typically, the kitchen and bathroom areas had to be located in the central room which does not move, in order to accommodate the rigid plumbing necessary for waste disposal lines, water lines, and gas lines. Therefore, generally only the living room section could be extended out from the central room. Unfortunately, separating the kitchen/bathroom from the extensible room prevents the usable area in the central cabin area from being maximized.

Attempts to locate the kitchen and bathroom areas in the extensible cabin portion have been relatively unsuccessful. One solution to locating the kitchen and bathroom areas in the extensible cabin portion is to provide for connection to the utility lines by quick release connectors. The use of quick release connectors, however, necessitates manually connecting and disconnecting the utility lines each time the extensible cabin portion is moved into the extended position. This can lead to an increased likelihood of a poor connection causing leakage. Further, this leakage could lead to safety problems.

OBJECTS AND SUMMARY OF THE INVENTION

It is an object of the invention to provide a vehicle, such as a mobile home, house trailer, recreational vehicle, or the like having a laterally extensible cabin with kitchen and/or bathroom areas that does not require manual connection of plumbing.

It is an object of the invention to provide a flexible plumbing assembly permitting the extensible cabin portion of a trailer, mobile home, recreational vehicle or the like to contain areas needing rigid plumbing such as kitchen and bathroom areas thereby increasing the usable interior space of the main room of the trailer.

It is an object of the invention to provide a flexible plumbing assembly which allows the rigid plumbing in the extensible cabin portion to be used in both the extended and retracted positions.

It is a related object to provide a flexible plumbing assembly that does not require manual disconnection of the rigid plumbing in the trailer from the rigid plumbing in the extensible cabin portion when the cabin is moved from the retracted to the extended positions.

It is a related object to provide a flexible plumbing assembly which allows the rigid plumbing in the extensible cabin to be used when the trailer is moving.

Another object of the present invention is to provide a flexible plumbing assembly that maintains a proper drain slope as the extensible cabin moves between the extended and retracted positions.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
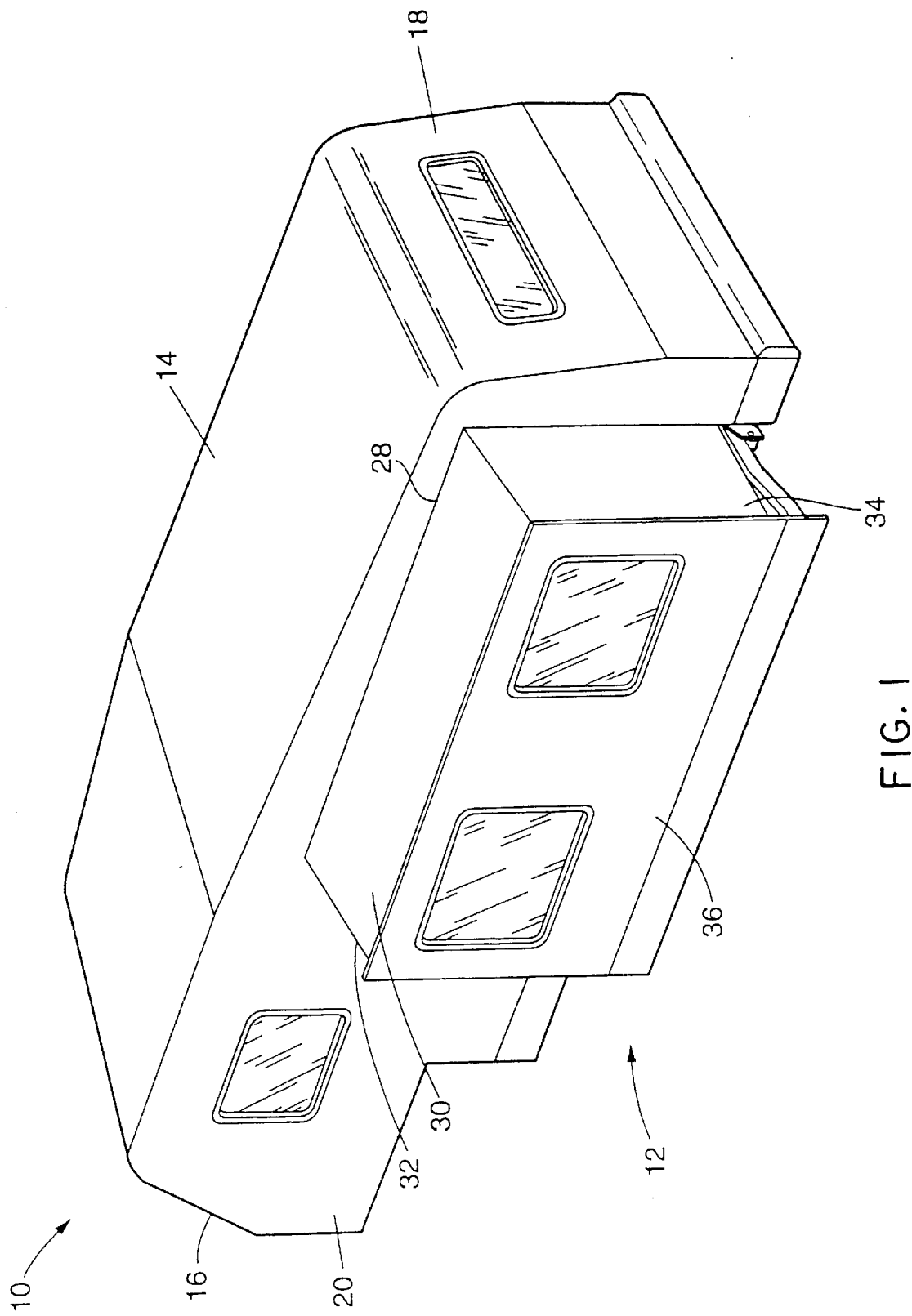
FIG. 1 is a perspective view of a fifth wheel trailer with an extensible cabin in the extended position.

Referring to the drawings and particularly to FIG. 1, the trailer 10 has an extensible cabin or room 12 and a slideout mechanism (not shown), and a flexible plumbing assembly 50. Although the illustrated trailer is of the "fifth wheel" type which is adapted to be towed by a vehicle (not shown) disposed at the front end, it will be appreciated that the invention is applicable to any type of expandable vehicle or trailer.

The trailer 10 generally has a ceiling 14, a front wall 16, a rear wall 18, two opposing side walls 20 (only the left wall is shown), and a floor 22 which generally define an interior living space or central room 24. In the illustrated embodiment, the left side wall 20 has an opening 28 for receiving the extensible cabin 12. The extensible cabin 12 has a cabin ceiling 30, a front wall 32, a rear wall 34, side wall 36, and a floor 38.

Figure 2:
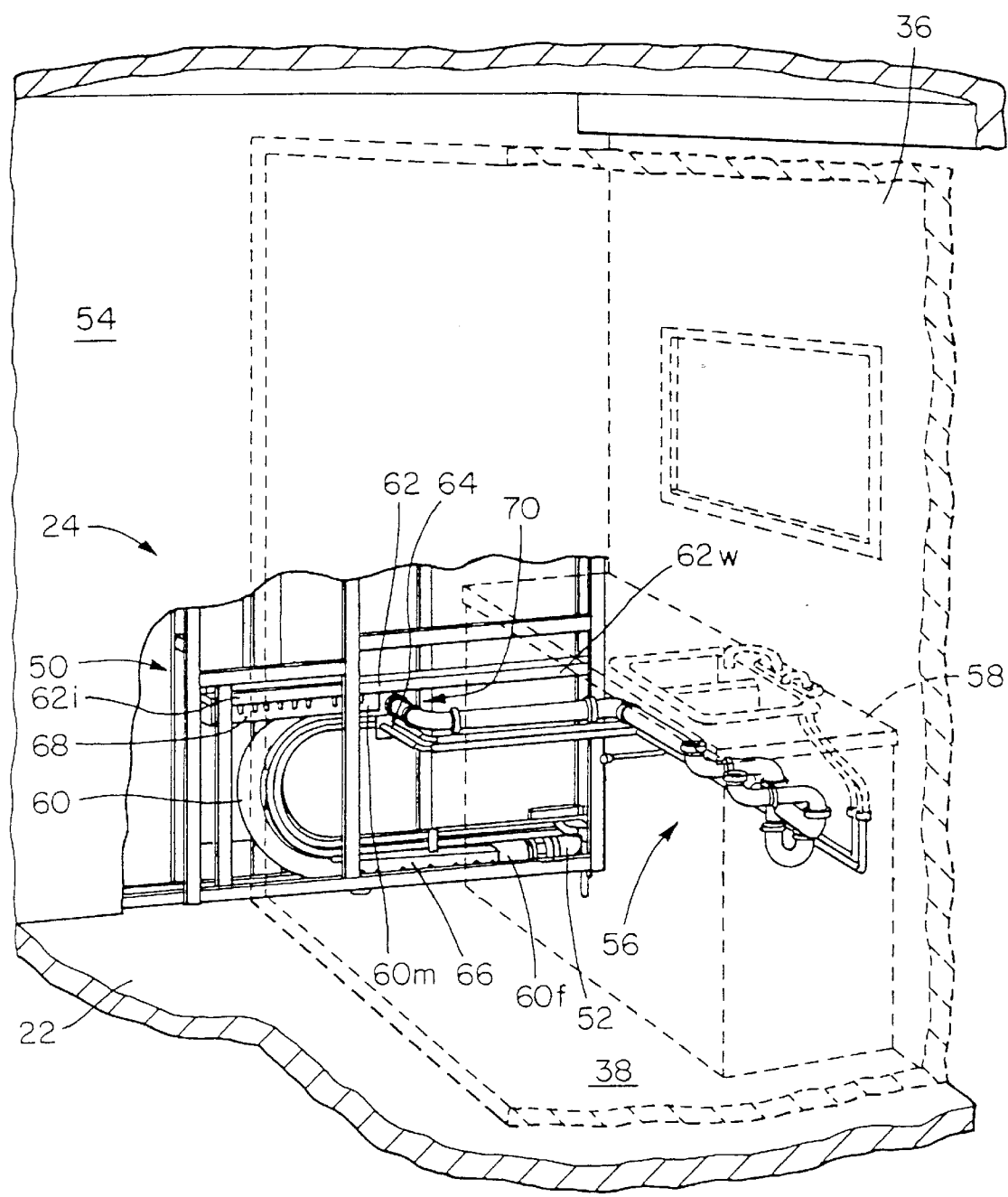
FIG. 2 is a perspective cut away view showing the flexible plumbing assembly disposed within the panel wall in the central room of the trailer and the extensible cabin (in broken lines) in the retracted position.
Figure 3:
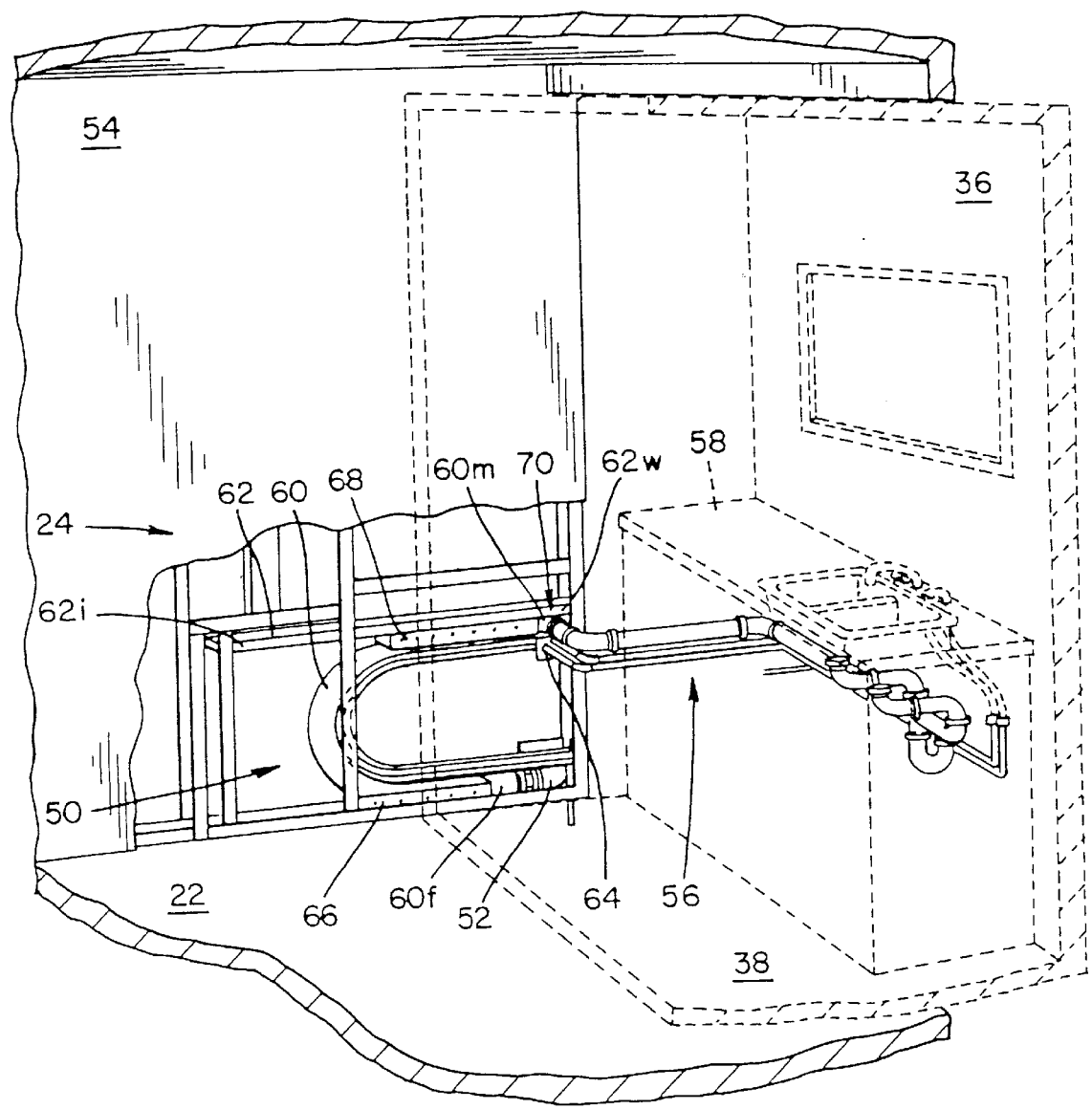
FIG. 3 is perspective cut away view showing the flexible plumbing assembly disposed within the panel wall in the central room of the trailer and the extensible cabin (in broken lines) in the extended position.

The extensible cabin 12 is movable between an extended position generally shown in FIG. 1 and in broken lines in FIG. 3 and a retracted position generally shown in broken lines in FIG. 2. In the extended position, the extensible cabin 12 is extended outwardly from the interior trailer space 24 which increases the overall space available inside the trailer 10. In the retracted position, the cabin 12 is positioned inwardly into the interior space 24 of the trailer 10 which decreases the exterior dimensions of the trailer 10 for towing and transport over the highways. The trailer 10 has a slideout mechanism (not shown) for positioning the cabin 12 between the retracted and extended positions. U.S. patent application Ser. No. 08/311,945 dated Sep. 26, 1994, which is incorporated by reference, describes several different slideout mechanisms.

The trailer 10 has a flexible plumbing assembly 50 for maintaining the connection between rigid plumbing in the interior space 24 of the trailer and rigid plumbing in the extensible cabin 12 as the extensible cabin moves between the extended and retracted positions, in accordance with the present invention. The trailer plumbing system may include water or propane supply tanks or storage tanks for waste water and other waste material disposed in the interior space 24 of the trailer. In addition, the plumbing system may include hot and cold water supply lines and drain lines for sinks and a shower, propane supply lines for a gas stove, or drain lines for waste material from a toilet all located in the extensible cabin 12.

As best shown in FIG. 2, the trailer 10 has a plumbing system with rigid plumbing located in both the interior space 24 of the trailer 10 and in the extensible cabin 12 (in broken lines). The interior plumbing 52 is disposed within a panel wall 54 located in the interior space 24 of the trailer 10. The extensible cabin plumbing 56 is contained within a cabinet 58 located along the side wall 36 of the extensible cabin 12. The flexible plumbing assembly 50 connects the interior plumbing 52 to the extensible cabin plumbing 56 enabling material such as water, waste, or gas to be transported several feet horizontally between the interior space and the extensible cabin when the extensible cabin is in the extended position. Although the illustrated extensible cabin plumbing means is a sink with a double wash basin and a gas line for a stove (not shown) along the side wall 36 of the extensible cabin 12, it will be appreciated that the invention is applicable to any type of rigid plumbing that is located within the extensible cabin 12.

The flexible plumbing assembly 50 may comprise a flexible hose, means for horizontally sliding the connection of the flexible hose to the cabin plumbing at the same elevation relative to the floor of the extensible cabin as the extensible cabin moves between the extended and retracted positions, and means for guiding the flexible hose so that the flexible hose maintains a slope sufficient to allow for waste to drain in the proper direction as the extensible cabin moves between the extended and retracted positions.

The flexible hose 60 has a fixed end 60f and a movable end 60m as shown in FIG. 2. In the illustrated embodiment, the fixed end 60f of the flexible hose 60 is attached to the rigid interior plumbing 52. The movable end 60m of the flexible hose 60 is attached to the extensible cabin rigid plumbing 56. The flexible hose 60 is comprised of a flexible material that can bend to accommodate the movement of the extensible cabin 12 between the retracted and extended positions. The flexible hose may be made from any flexible material which will be known to those skilled in the art including, but not limited to, PVC. Further, those skilled in the art will appreciate that the diameter of the flexible hose is dependent upon the size of the trailer and the type of interior plumbing and extensible cabin plumbing the flexible hose is being used to connect. The flexible hose can have a diameter that ranges anywhere from ¼ inch to 6 inches. In addition, the flexible hose 60 must be of length sufficient to reach the extensible cabin rigid plumbing 56 when the extensible cabin 12 is in the extended position. It will be appreciated that the flexible hose 60 can be used to connect rigid propane, hot and cold water supply, drainage, and sewage plumbing in the interior space 24 to like plumbing in the extensible cabin 12.

The sliding means comprises a track 62 and a support bracket 64, as depicted in FIG. 2. As illustrated the track 62 and the support bracket 64 are disposed in the hollow interior of the panel wall 54 that is positioned in the interior space 24 so that it is generally parallel to the extensible cabin 12 front wall 32 and rear wall 34. Further, the track 62 is disposed so that it runs generally parallel to both extensible cabin floor 38 and the front and rear walls 32 and 34 of the extensible cabin 12. For ease of reference, the track 62 has an interior end referenced as 62i and an outboard or wall end referenced as 62w, as shown in FIGS. 2 and 3. The track 62 is adapted to receive the support bracket 64.

The support bracket 64 is adapted to receive and support the connection 70 between the flexible hose movable end 60m and the extensible cabin rigid plumbing 56. In order to accommodate the horizontal movement of the extensible cabin rigid plumbing 56 relative to the interior space rigid plumbing 52, the support bracket 64 is slidably connected to the underside of the track 62. The support bracket 64 is disposed at the track interior end 62i when the extensible cabin 12 is in the retracted position, as shown in FIG. 2. As the extensible cabin 12 is moved towards the extended position, the support bracket 64 travels horizontally along the track 62 towards the outboard or wall end 62w of the track in unison with the extensible cabin 12. In addition, the support bracket 64 is maintained at a constant level above the extensible cabin floor 38 in order to accommodate the fixed elevation of the extensible cabin rigid plumbing 56 relative to the extensible cabin floor 38. Thus, when the extensible cabin 12 is in the fully extended position, the support bracket 64 is at the outboard or wall end 62w of the track and the flexible hose 60 has bent to accommodate the movement from the retracted to the extended positions, as shown in FIG. 3. In this manner the connection between the movable end of the flexible hose 60m and the extensible cabin plumbing 56 moves along both in unison with the extensible cabin 12 and at a constant level above the extensible cabin floor 38 as the extensible cabin 12 causes the extensible cabin plumbing 56 to move horizontally between the extended and retracted positions.

The flexible hose guiding means comprises a fixed hose guide 66 and a movable hose guide 68. The fixed hose guide 66 is disposed along the bottom of the panel wall 54 where the flexible hose runs generally parallel to the trailer floor 22. The movable hose guide 68 is disposed on the underside of the track 62 where the flexible hose also runs generally parallel to the trailer floor 22. Further, the movable hose guide 68 is both rigidly attached to the support bracket 64 and slidably attached to the track 62. Thus, as the extensible cabin 12 moves between the retracted and extended positions, the movable hose guide 68 moves in unison with the support bracket 64 towards the outboard or wall end 62w of the track. In order to ensure that material in the flexible hose drains in the proper direction in the areas where it tends to run horizontally, the hose guiding means can be adjusted to provide any predetermined slope in the flexible hose that is necessary to insure proper drainage or to meet any applicable regulations. In the preferred embodiment, both the fixed hose guide 66 and the movable hose guide 68 are adapted to hold the flexible hose 60 so that a one quarter inch per foot slope is maintained in the areas where the flexible hose tends to run horizontally.

Thus, it will be seen that a novel and improved flexible plumbing assembly for use in slideout trailers has been provided which attains the aforementioned objects. Various additional modifications of the embodiment specifically illustrated and described herein will be apparent to those skilled in the art, particularly in light of the teachings of this invention.

We claim as our invention:

1. A flexible plumbing system for use in a recreational vehicle having a fixed cabin including a floor and a wall structure, and a movable cabin having a floor and a wall structure movable between extended and retracted positions relative to the fixed cabin, said flexible plumbing system comprising at least one pipe in the fixed cabin having an opening at one end for enabling the flow of material through the fixed cabin pipe, at least one pipe in the movable cabin having an opening at one end for enabling the flow of material through the movable cabin pipe, a flexible hose having fixed and movable ends, a first connection for connecting the fixed hose end to the opening of the fixed cabin pipe, and a second connection for connecting the movable hose end to the opening of the movable cabin pipe, and support means for operatively supporting at least one of the first and second hose connections relative to the other of the first and second hose connections for enabling material to flow through the flexible hose in a desired direction between the fixed cabin pipe and movable cabin pipe regardless of the location and movement of the movable cabin between the extended and retracted positions.

2. The flexible plumbing system as set forth in claim 1 wherein said support means supports the second hose connection at an elevation substantially above the first hose connection so that the material flows from the movable pipe opening towards the fixed pipe opening.

3. The flexible plumbing system as set forth in claim 1 wherein the second hose connection is disposed at a substantially constant elevation relative to the movable cabin floor as the movable cabin extends and retracts.

4. The flexible plumbing system as set forth in claim 1 including a track operatively attached to the wall structure of the movable cabin for receiving the support means, and the track has inboard and outboard ends, and the support means is slidably attached to the track for movement between inboard and outboard ends of the track, wherein the support means moves between the inboard end when the movable cabin is in the retracted position and the outboard end when the movable cabin is in the extended position.

5. The flexible plumbing system as set forth in claim 1 wherein the support means supports at least one of the first and second hose connections at a substantially constant elevation relative to the movable cabin floor as the movable cabin moves between the extended and retracted positions.

6. The flexible plumbing system as set forth in claim 1 wherein the support means supports the first hose connection for creating a desired drainage slope in the flexible hose.

7. The flexible plumbing system as set forth in claim 1 wherein the support means includes a bracket that supports the second hose connection above the first hose connection as the movable cabin moves between the extended and retracted positions.

8. The flexible plumbing system as set forth in claim 7 wherein the bracket is disposed to maintain the elevation of the second hose connection relative to the first hose connection so that the flexible hose forms a slope sufficient to allow material to drain in the desired direction when the movable cabin is positioned between the extended and retracted positions.

9. The flexible plumbing system as set forth in claim 8 wherein the slope is at least about one quarter inch per foot.

10. The flexible plumbing system as set forth in claim 7 wherein the second hose connection is disposed at a substantially constant elevation relative to the movable cabin floor as the movable cabin extends and retracts.

11. The flexible plumbing system as set forth in claim 7 including a track operatively attached to the wall structure of the movable cabin for receiving the bracket, and the track has inboard and outboard ends, and the bracket is slidably attached to the track for movement between the inboard and outboard ends of the track wherein the bracket moves between the inboard end when the movable cabin is in the retracted position and the outboard end when the movable cabin is in the extended position.

12. The flexible plumbing system as set forth in claim 1 wherein the support means includes a bracket that supports the first hose connection for creating a drainage slope in the flexible hose.

13. The flexible plumbing system as set forth in claim 1 wherein the support means includes a first bracket that supports the first hose connection and a second bracket that supports the second hose connection for creating a drainage slope in the flexible hose.

14. The flexible plumbing system as set forth in claim 1 wherein the support means includes a bracket that supports at least one of the first and second hose connections at a substantially constant elevation relative to the movable cabin floor as the movable cabin moves between the extended and retracted positions.

15. The flexible plumbing system as set forth in claim 1 wherein the support means includes a bracket disposed to maintain the elevation of the second hose connection relative to the first hose connection so that the flexible hose forms a slope sufficient to allow material to drain in the desired direction when the movable cabin is positioned between the extended and retracted positions.

16. The flexible plumbing system as set forth in claim 1 including a guide engaging at least a portion of the flexible hose between the first and second hose connections to retain the flexible hose at a desired drainage angle as the movable cabin moves between the extended and retracted positions.

17. The flexible plumbing assembly as set forth in claim 16 wherein the guide includes a first guide member disposed near the first hose connection for receiving the flexible hose and retaining the flexible hose at the desired drainage angle.

18. The flexible plumbing assembly as set forth in claim 17 wherein the guide includes a second guide member disposed near the second hose connection for receiving the flexible hose and retaining the flexible hose at the desired drainage angle.

19. The flexible plumbing assembly as set forth in claim 1 wherein at least a portion of the flexible hose between the first and second hose connections is disposed within the wall structure of the fixed and movable cabins at a desired drainage angle as the movable cabin moves between the extended and retracted positions.

20. The flexible plumbing assembly as set forth in claim 19 wherein a plane passing through the first and second hose connections is substantially parallel to walls of the fixed and movable cabins.

21. The flexible plumbing assembly as set forth in claim 1 comprising sliding means for horizontally moving the second hose connection in the movable cabin at a constant elevation relative to the movable cabin floor as the movable cabin pipe moves with the movable cabin between the extended and retracted positions.

22. The flexible plumbing assembly as set forth in claim 21 wherein the support means comprises a bracket and the sliding means comprises a track operatively attached to a wall structure of the movable cabin for receiving the bracket wherein the track has inboard and outboard ends and the bracket is slidably attached to the track for movement between the inboard end when the movable cabin is in the retracted position and the outboard end when the movable cabin is in the extended position.

23. The flexible plumbing system as set forth in claim 1 comprising hose guiding means for holding at least a portion of the flexible hose means for ensuring that material in the flexible hose moves in the desired direction as the movable cabin moves between the extended and retracted positions.

24. The flexible plumbing assembly as set forth in claim 23 wherein the hose guiding means comprises a fixed hose guide disposed near the first hose connection where the flexible hose runs generally horizontal and a movable hose guide disposed near the second hose connection where the flexible hose also runs generally horizontal, wherein both the fixed hose guide and the movable hose guide are adapted to hold the flexible hose so that material in the flexible hose flows in the proper direction.

25. The flexible plumbing assembly as set forth in claim 1 further comprising hose guiding means for holding at least a portion of the flexible hose at a desired drainage angle as the movable cabin moves between the extended and retracted positions.

26. The flexible plumbing assembly as set forth in claim 25 wherein said hose guiding means includes a fixed hose guide channel disposed near said fixed hose end, and a movable hose guide channel secured to move with said bracket near said movable hose end wherein portions of the hose lie respectively in the fixed hose guide channel and the movable hose guide channel at desired drainage angles.

27. The flexible plumbing assembly as set forth in claim 26 wherein said guide channels hold said hose in a generally U-shaped bend between said guide channels.

* * * * *